United States Patent Office 2,806,058
Patented Sept. 10, 1957

---

2,806,058

TREATMENT OF NAPHTHENIC ACIDS

Ivor W. Mills, Glenolden, Pa., assignor to Sun Oil Company, Philadelphia, Pa., a corporation of New Jersey No Drawing. Application June 1, 1954,
Serial No. 433,817

2 Claims. (Cl. 260—514)

This invention relates to the treatment of petroleum naphthenic acids to improve the color stability thereof.

Crude naphthenic acids as recovered from mineral oil generally are very dark in color and have poor color stability. Light colored naphthenic acids may be obtained from the crude acids by refining procedures such as vacuum distillation, but these light colored acids are not color stable and tend to darken rapidly in storage. Light, stable color is an important property of naphthenic acids.

Now, in accordance with the present invention, naphthenic acids are improved in color stability merely by subjecting these acids to contact treatment with solid material comprising a calcined mixture of phosphoric acid and siliceous carrier. This solid material is widely used as a catalyst for polymerizing olefins and is commonly referred to in the art as "solid phosphoric acid." A description of this solid material is given in U. S. Patent 2,018,065. The contact treatment may be effected by any of procedures known in the art for intimately contacting liquid with solid material; examples of such procedures are contact filtration or percolation. The contact is conducted at an advanced temperature in order to insure adequate activity of the solid contact material and to lessen the viscosity of the naphthenic acids so-treated and thus facilitate intimate liquid-solid contact during the treatment. If desired, the charge naphthenic acids may also be diluted with a saturate hydrocarbon such as petroleum naphtha in order to further lessen the viscosity and facilitate liquid-solid contact. Contact temperatures in the range of about 100 °F. to 500° F. are generally suitable although a range of about 150° F. to 400° F. is preferred.

Naphthenic acids of substantially any degree of refinement may be treated with advantage by the process of this invention, but it is desirable that the acids so-treated are first subjected to refining procedures whereby the oil content of these acids is reduced to a minor amount, for example, less than 25% by weight, or more preferably less than 15% by weight. Crude de-oiled naphthenic acids which are very dark in color are advantageously treated by this invention; such crude acids after contact with the solid phosphoric acid may be vacuum distilled to produce light colored distillate fractions of improved color stability. The contact treatment of this invention may also be applied to light colored naphthenic acids such as distillate fractions from the vacuum distillation of crude naphthenic acids. In this latter case, the distillate side streams from the fractionator may be treated according to the invention to stabilize the light color of the acids obtained from the distillation; such treated acids need not be redistilled since there is substantially no sludge formed by the practice of this invention. In general, the most advantageous application of this invention is best determined according to the particular circumstances and refining procedures of each utilization.

The duration of the contact treatment of this invention is dependent both upon the quality of the naphthenic acids so-treated and upon the stability improvement desired. Generally, percolation of the naphthenic acids through solid phosphoric acid at liquid hourly space rates in the range of about 0.5 to 10 volumes of liquid feed per volume of solid phosphoric acid per hour are suitable, with the lower space rates being preferred. The lower quality naphthenic acids require more severe contact conditions. There is no appreciable loss of naphthenic acids through the treatment of this invention, that is, substantially all the naphthenic acids contacted with the solid phosphoric acid can be obtained therefrom with improved color stability.

Through continued use, the solid phosphoric acid contact material undergoes a gradual deactivation. Generally, 1 ton of solid phosphoric acid may be used to treat 1000 to 2000 barrels of naphthenic acids by the present process before replacement or reactivation of the solid phosphoric acid is necessary; the treatment of lower quality naphthenic acids results in the shorter active life of the solid phosphoric acid. The spent solid phosphoric acid material may be reactivated by contact with an acid such as $H_2SO_4$ or $HCl$.

The solid phosphoric acid contact material used in this invention is a type of catalyst widely used commercially to promote the polymerization of olefins. This material is prepared by mixing phosphoric acid with silicious adsorptive material such as kieselguhr in proportions such that the phosphoric acid comprises a predominance of the resulting mixture by weight. This mixture is then calcined at temperatures in the range of about 392° F. to 572° F. to form a somewhat dehydrated solid mass which, after grinding and sizing, is suitable for use in the present invention as the solid phosphoric acid contact material.

The exact nature of the color stabilization reaction between the solid phosphoric acid and the naphthenic acids is not known. It is, however, believed that the color stabilization is due to either or both an ion exchange reaction or to a dehydroxylation reaction. It is believed that trace amounts of metal naphthenates, such as iron naphthenates, generally are present in naphthenic acid fractions and tend to act as catalysts causing color degradation of the naphthenic acids. It is theorized that by contacting naphthenic acids with solid phosphoric acid, traces of metal ions from the metal naphthenates are exchanged for hydrogen ions from the solid phosphoric acid material. Thus naphthenic acids are regenerated from such metal naphthenates, and the metallic ions remain as part of the solid phosphoric acid material; in this manner harmful metal ions are permanently removed from the naphthenic acids. An additional or alternate theory is that due to the extremely strong affinity for water of the solid phosphoric acid, this solid material is capable of dehydroxylating and thus rendering inactive phenolic compounds contained in the naphthenic acids which are deleterious to the color stability thereof. The scope of the present invention is not intended, however, to be unnecessarily limited by the foregoing explanations as to why mere contact with the solid phosphoric acid is effective to improve the color stability.

This invention is particularly advantageous in that naphthenic acid color may be effectively stabilized by a relatively simple operational procedure. There is no appreciable quantity of sludge formed through the contact treatment of this invention and essentially no loss of naphthenic acids. Thus any necessity for decantation vessels or other liquid separation apparatus is eliminated. There is no corrosion problem to be overcome by practice of the invention. The equipment required for practicing the process is relatively simple, since all that is needed is a vessel suitable for containing solid particles and having means for liquid to flow therethrough and also means for controlling the temperature therein.

The folowing example illustrates the invention.

*Example I*

Crude de-oiled naphthenic acids of about 130 acid no. were diluted with a non-olefinic petroleum naphtha to form a mixture comprising by volume about 2 parts of naphthenic acids to 1 part of naphtha. The naphtha served merely as a diluent to reduce viscosity and facilitate contact. About 2000 cc. of this mixture were percolated through 250 cc. of solid catalyst comprising a calcined mixture of phosphoric acid and kieselguhr, at a space velocity of about 1.0 volume of liquid feed per volume of catalyst per hour; the percolation contact was conducted at a temperature of about 300° F. The thus treated naphthenic acid-naphtha mixture was stripped to remove the naphtha therefrom, and the remainder of the mixture was vacuum distilled. A distillate fraction was collected which comprised 5 to 32% of the original naphthenic acid charge, and which had an acid no. in the range of about 168–172 and an initial NPA color of 4-. The distillate fraction was subjected to accelerated aging at 150° F. while exposed to air.

Crude de-oiled naphthenic acids similar to those charged above were vacuum distilled without being treated according to this invention. Distillate fractions were collected and subjected to accelerated aging at 140° F. while exposed to air. The following table summarizes the results obtained:

| Distillate Fraction, percent of Charge | Not Treated | | | | Treated |
|---|---|---|---|---|---|
|  | 0–10 | 10–20 | 20–30 | 30–40 | 5–32 |
| Acid No | 204 | 179 | 163 | 142 | 168–172 |
| NPA Color: |  |  |  |  |  |
| Initial | 3 | 3½ | 3- | 4- | 4- |
| 1 Day Aging | 8 | ¹ T. D. | ¹ T. D. | 6½+ |  |
| 4 Days Aging | ¹ T. D. |  |  | ¹ T. D. |  |
| 11 Days Aging |  |  |  |  | 8+ |

¹ Too dark.

These results show that the naphthenic acids treated according to this invention exhibit improved color stability as compared to similar acids which had not been so treated. The treated acids retained color on the NPA scale for 11 days at accelerated aging conditions while untreated acids aged under somewhat less severe conditions (140° F. instead of 150° F.) turned too dark on the NPA scale in four days or less.

In a copending application Serial No. 433,574 of I. W. Mills and W. A. Gallup which is of even filing date herewith, there is disclosed and claimed a process for improving the properties of naphthenic acids by contacting these acids with olefin hydrocarbon in the presence of solid phosphoric acid catalyst under alkylating conditions. That process is separate and distinct from the process of the instant invention since different reactions are involved and somewhat different results are obtained. The process described in the above copending application involves an olefin alkylation reaction with the formation of highboiling reaction products which are separated by distillation from the refined naphthenic acids. The instant process merely involves naphthenic acid-solid phosphoric acid content with no appreciable formation of high boiling or sludge-like material. No olefin hydrocarbon is used in this present process. Naphthenic acids produced by the process of the copending application may have somewhat superior color stability as compared to those produced by the instant process, and in addition have a substantially reduced bromine number. The process of the present invention offers a simpler and less expensive method for effecting improvement in color stabilization of naphthenic acids, which method is particularly useful where a high degree of color stabilization and a reduction in bromine number are not required.

I claim:

1. The method of improving the color stability of naphthenic acids which comprises contacting at a temperature of from about 150° F. to 400° F., in the absence of added olefinic material, naphthenic acids with solid particles consisting essentially of a mixture of phosphoric acid and a siliceous adsorptive material, said mixture having a predominance of phosphoric acid and having been calcined at a temperature within the range of from 392° F. to 572° F., and separating naphthenic acids having improved color stability from the calcined mixture of phosphoric acid and siliceous adsorptive material.

2. The method of improving the color stability of naphthenic acids which comprises percolating at a liquid hourly space rate of from 0.5 to 10, a temperature of from about 150° F. to 400° F., and in the absence of added olefinic material, naphthenic acids through solid particles consisting essentially of a mixture of phosphoric acid and a siliceous adsorptive material, said mixture having a predominance of phosphoric acid and having been calcined at a temperature within the range of from 392° F. to 572° F., and recovering from the solid contact material substantially all of the naphthenic acids having improved color stability.

References Cited in the file of this patent

UNITED STATES PATENTS

| 1,914,953 | Malishev | June 20, 1933 |
| 2,133,765 | Ewing | Oct. 18, 1938 |

FOREIGN PATENTS

| 113,131 | Great Britain | Feb. 6, 1915 |